United States Patent [19]

Dawe et al.

[11] Patent Number: 5,203,411
[45] Date of Patent: Apr. 20, 1993

[54] OIL RECOVERY PROCESS USING MOBILITY CONTROL FLUID COMPRISING ALKYLATED DIPHENYLOXIDE SULFONATES AND FOAM FORMING AMPHOTERIC SURFACTANTS

[75] Inventors: Robert D. Dawe, Sarnia; Thomas Oswald, Fort Saskatchewan; Ian A. Robson, Bright's Grove, all of Canada

[73] Assignee: The Dow Chemical Company, Midland, Mich.

[21] Appl. No.: 849,270

[22] Filed: Mar. 11, 1992

[51] Int. Cl.$^5$ .............................................. E21B 43/22
[52] U.S. Cl. ..................... 166/274; 166/268; 166/275; 166/309; 252/8.554
[58] Field of Search ............... 166/268, 273, 274, 275, 166/309; 252/8.554

[56] References Cited

U.S. PATENT DOCUMENTS

| 4,008,165 | 2/1977 | Maddox, Jr. et al. | 252/355 |
|---|---|---|---|
| 4,130,491 | 12/1978 | Wagner et al. | 252/8.554 |
| 4,497,717 | 2/1985 | Bretherick et al. | 252/8.554 |
| 4,501,673 | 2/1985 | Hodgson | 252/8.554 |
| 4,502,540 | 3/1985 | Byham | 166/274 |
| 4,703,797 | 11/1987 | Djabbarah | 166/252 |
| 4,704,229 | 11/1987 | Brunel et al. | 252/352 |
| 4,706,750 | 11/1987 | Buckles | 166/274 X |
| 4,739,831 | 4/1988 | Settlemeyer et al. | 166/274 X |
| 4,820,429 | 4/1989 | Lim | 166/272 X |
| 4,860,828 | 8/1989 | Oswald et al. | 166/268 X |
| 4,923,009 | 5/1990 | Watkins | 166/272 |
| 5,000,262 | 3/1991 | Danzik | 166/309 X |
| 5,074,358 | 12/1991 | Rendall et al. | 166/268 X |

Primary Examiner—George A. Suchfield

[57] ABSTRACT

The recovery of hydrocarbons from subterranean formations is improved by the use of a mobility control fluid comprising a mixture of at least one alkylated diphenyl oxide and at least one amphoteric surfactant. A preferred mobility control fluid comprises the disodium salt of hexyldiphenyloxide disulfonate and cocamido-2-hydroxypropyl sultaine.

19 Claims, No Drawings

OIL RECOVERY PROCESS USING MOBILITY CONTROL FLUID COMPRISING ALKYLATED DIPHENYLOXIDE SULFONATES AND FOAM FORMING AMPHOTERIC SURFACTANTS

BACKGROUND OF THE INVENTION

This invention relates generally to a process for the recovery of oil from subterranean formations, and more particularly to a gas flooding or a miscible gas flooding process.

Petroleum or oil is generally recovered from subterranean formations by penetrating the formation with one or more wells and pumping or permitting the petroleum to flow to the surface through the well. In various recovery operations, an external driving force is not required to drive the petroleum to the producing well and/or the surface. For example, some natural driving energy such as an underlying active water drive or a gas under some minimum pressure may possess sufficient pressure to drive the petroleum or hydrocarbon to the well and then to the surface. Recovery of petroleum using natural energy is referred to as primary recovery.

In many instances, the natural driving energy is insufficient or becomes insufficient to cause the petroleum to flow to the well. For example, a substantial portion of the petroleum to be recovered may remain in the formation after depletion of the natural driving energy. In other cases, the subterranean formation, while containing substantial amounts of petroleum, may not possess the necessary driving force to recover any of the petroleum. In such cases, various techniques have been applied heretofore to recover the petroleum. Although such techniques are commonly referred to as secondary recovery, in fact, they may be primary, secondary or tertiary in sequence of employment.

One example of a conventional method for the secondary recovery of petroleum from a subterranean formation involves injecting water or non-miscible gas through one or more injection wells to drive the residual petroleum or oil towards a producing well. A non-miscible gas is one which is not miscible with the hydrocarbons present in the subterranean formation. However, water or non-miscible gas alone do not efficiently displace petroleum. In various operations, the water or non-miscible gas mixture channel through the formation such that a disproportionately high amount of the water or non-miscible gas passes through zones of high permeability into the producing wellbore without contacting appreciable amounts of oil in the reservoir, particularly that oil contained in zones of low permeability. Further, water or non-miscible gas fails to displace even all of the oil in the swept zones because capillary pressure holds residual oil or hydrocarbons in the smaller reservoir capillaries allowing the water or the non-miscible gas to channel around them. This greatly reduces the efficiency of the operation.

One common method of recovering the residual oil trapped in the capillaries of the reservoir after water or non-miscible gas flooding is to contact the residual hydrocarbon with a miscible supercritical fluid. This supercritical fluid is frequently the same as the gas which, under ordinary temperature and pressure is non-miscible, but when subjected to high pressure under the conditions of the subterranean formation becomes a supercritical fluid with which the residual oil is miscible. Thus, under conditions of use, the non-miscible gas used may exist both as a non-miscible gas and as a miscible supercritical fluid. Examples of gases which can exist as supercritical fluids under conditions of use and which are useful in this process include carbon dioxide and mixtures of aliphatic hydrocarbons such as methane, ethane, propane and butane, and may even include nitrogen in very deep wells which can operate under high pressure.

In both the case of gas flood recovery and miscible fluid recovery, the gas or miscible fluid can be injected continuously and simultaneously with water in the same injection well or alternating with slugs of water. Alternatively, the gas or miscible fluid can be injected without water and, in such cases, will frequently form a dispersion with water which naturally exists in the formation or has been injected prior to the gas injection. Although miscible fluid or a simultaneous miscible fluid/water mixture can be employed, miscible fluid or gas flooding generally comprises alternating the injection of miscible gas or fluid and water. In theory, the miscible gas thins or solubilizes the oil from the small capillaries in the formation thus allowing it to flow to the producing well. The water is added to provide some mobility control to the miscible fluid, restricting its advancement to the producing well, thereby causing it to make contact with a larger fraction of the reservoir.

Unfortunately, even in the presence of significant volumes of water, the gas or miscible fluid is prone to channel through the formation such that a disproportionately high amount of the gas or miscible fluid passes through the swept zones of the reservoir into the producing wellbore without contacting appreciable amounts of oil in the reservoir. Further, in miscible flooding operations, this high rate of flow prevents the pressure in at least parts of the reservoir from reaching the minimum pressure necessary to convert the non-miscible gas to a miscible supercritical fluid. This problem is further exacerbated in reservoirs containing zones of high permeability because both the gas or the miscible fluid and the water preferentially proceed to the producing wells by way of these zones. To prevent channeling of the gas or the miscible fluid and the water and to otherwise control the mobility of the drive fluid or the miscible fluid, thereby increasing oil production, it has been suggested to employ a foam prepared from a mixture of water and a surfactant during the gas flooding and/or miscible fluid flooding operations. Such mixtures have been found to prevent channeling and to force the miscible fluids or the gas drive fluids into the unswept and/or less permeable zones of the reservoir, thereby increasing oil production.

Surfactants which have been found to be useful as a means of modifying the profile in gas flooding or miscible fluid flooding operations are surfactants capable of forming a foam with an aqueous liquid and include alkyl polyethylene oxide sulfates (see, for example, U.S. Pat. No. 4,113,011); polyalkoxy sulfonates (see, for example, U.S. Pat. No. 4,502,538); polyalkoxylated alcoholic or phenolic surfactants (see, for example, U.S. Pat. No. 4,380,266) and the like. Mixtures of surfactants, such as a mixture of an alkylated diphenyl sulfonate and an anionic polyoxyalkylated surfactant, (see, for example, U.S. Pat. No. 4,739,831); a mixture of an alkylated diphenyloxide sulfonate and an alpha olefin sulphonate (see, for example, U.S. Pat. No. 4,860,828) or a mixture of amphoteric surfactants and lignosulphonates (see, for example, U.S. Pat. No. 4,703,797) are also taught to be useful.

Surfactants employed in gas flooding operations are exposed to water of relatively low purity such as water having a high dissolved solids content. This is because the connate water is usually highly saline and frequently contains divalent metal ions such as calcium and magnesium. Injected water, when derived from connate water, will have similar impurity content. When fresh water is to be injected, the typical practice is to add salts such as potassium chloride and other potassium salts. It is known in the art that such water soluble salts prevent clay swelling and other undesirable modifications to the oil bearing reservoir which would be caused by fresh water. Thus, in gas flooding operations, it is generally preferred to employ surfactants which are soluble in the presence of moderate to high concentrations of multivalent ions. Thus surfactants successfully employed in foam flood applications where water of low ionic strength is utilized are not necessarily useful in tertiary oil recovery methods using gas flooding techniques.

Dissolved solids are known to increase the adsorption of surfactants to mineral surfaces and therefore it is desirable to employ surfactants which resist this effect. The patent literature describes the use of sacrificial agents such as lignosulfonates to help reduce surfactant adsorption. Such surfactants do not generally improve the foaming qualities of the active foaming surfactants, but merely reduce the amount of the desired surfactant which is adsorbed on the mineral surfaces.

Further, the surfactants heretofore taught to be effective in modifying the mobility of the drive fluids in gas flooding or miscible fluid operations have not proved to be particularly effective in every such operation. Specifically, in certain instances, greater foam stabilities are desired to achieve the desired increase in oil production. In other instances, the surfactants have not been found to be particularly effective in the field regardless of their foaming ability as measured in the laboratory.

Amphoteric surfactants have been suggested for use in enhanced oil recovery processes, particularly where water of high ionic strength is likely to be encountered. This is especially true when the water contains significant concentration of multivalent ions such as calcium. See, for example, U.S. Pat. Nos. 4,130,491, 4,216,097, 4,259,191 and 4,090,969. This is due to the foaming properties of many amphoteric surfactants and the insensitivity of their foaming properties to very high concentrations of dissolved salts in the water. Unfortunately, these surfactants tend to adsorb very strongly to mineral surfaces such as those found in oil reservoirs. For this reason, amphoteric surfactants alone have found very limited utility in foam modified enhanced oil recovery processes. One way of reducing the adsorption of the surfactant is to either preflush the oil reservoir with a sacrificial agent which itself adsorbs to the mineral surface or to co-inject the sacrificial agent with the amphoteric surfactant.

Specific methods of using amphoteric surfactants are discussed in the literature. For example, U.S. Pat. No. 4,703,797 teaches the use of lignosulfonates with amphoteric surfactants. Two major disadvantages exist in relation to the use of sacrificial agents. First, during the co-injection of the amphoteric surfactant and sacrificial agent, the sacrificial agent is depleted as the mixture passes through the formation and eventually, the amphoteric surfactant will encounter mineral surfaces not protected and will itself be adsorbed. Similarly, in the preflush method, unless the oil reservoir is treated with sufficient sacrificial agent to protect all mineral surfaces, the amphoteric surfactant will be adsorbed to the unprotected mineral surfaces with a rapid decrease in its effectiveness. The second major disadvantage is that the sacrificial agent does not necessarily improve the foam forming properties of the amphoteric surfactant and may, in fact, lessen or decrease the effectiveness of the amphoteric surfactant. U.S. Pat. No. 4,703,797 teaches the certain lignosulfonates may be mixed with cocoamidopropyl betaine, an amphoteric surfactant. When mixed in a 50/50 blend, the foaming qualities are similar to the unblended betaine.

In view of the deficiencies of the prior art methods for improving the mobility of the drive fluids in gas flooding or miscible fluid operations, it remains highly desirable to provide a useful new method for controlling the mobility of the drive fluids in gas flooding operations and of miscible fluids in miscible fluid flooding operations.

SUMMARY OF THE INVENTION

Accordingly, the present invention is a method for recovering hydrocarbons from a subterranean formation. The recovery method comprises injecting, sequentially or simultaneously, into the subterranean formation containing hydrocarbons, (1) a drive fluid selected from the group consisting of
(a) a gas to drive the hydrocarbons,
(b) a gas/aqueous fluid mixture to drive the hydrocarbons,
(c) a miscible fluid to thin or solubilize and carry the hydrocarbons, and
(d) a miscible fluid/aqueous fluid mixture to thin or solubilize and carry the hydrocarbons from the formation to a producing well; and (2) a mobility control fluid of a surfactant/aqueous fluid mixture comprising a mixture of one or more alkylated diphenyloxide sulfonates and one or more foam forming amphoteric surfactants under conditions such that the hydrocarbon is recovered from the subterranean formation.

As used herein, the term "mobility control" is employed in its broadest sense and is meant to include the term "profile modification." The term "mobility control" is meant to include any process whereby the sweep efficiency of a reservoir is improved or whereby the injection profile of an injection well is altered. The term "sequentially injecting" is meant to include those operations in which the drive fluid or the miscible fluid and the mobility control fluid are injected as separate sequential "slugs" as well as operations in which the drive fluid or miscible fluid is injected continuously and the mobility control fluid is injected either simultaneously with the drive fluid, but on a periodic basis or alone as part or all of the water cycle in a water-alternating-gas process, followed by the injection of the gas drive fluid or the miscible gas or any combination of these deemed useful.

Using one or more alkylated diphenyl sulfonates in combination with one or more foam forming amphoteric surfactants unexpectedly improves the mobility reduction factor over that obtained by the use of foam forming amphoteric surfactants without the alkylated diphenyl sulfonates. Additionally, the use of the combination significantly reduces the adsorption of the foam forming amphoteric surfactants to rock, sand and clay particles.

DETAILED DESCRIPTION OF THE INVENTION

The mobility control fluid employed in the practice of the present invention comprises a mixture of one or more alkylated diphenyl sulfonate surfactants and one or more foam forming amphoteric surfactants. As the term is used herein, alkylated diphenyl sulfonates are represented by the general structural formula:

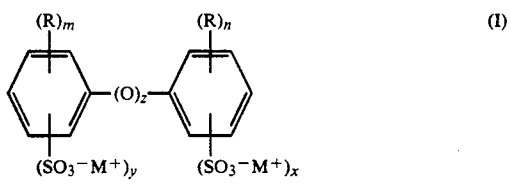

wherein z is 0 or 1, preferably 1; each R is independently an alkyl or substituted alkyl radical; each m and n is independently 0, 1 or 2, with the proviso that in at least 70 percent of the molecules m+n=1 and for the remaining up to 30 percent of the molecules, m+n=2; each M is independently hydrogen, an alkali metal, alkaline earth metal, or ammonium or substituted ammonium and each x and y are individually 0 or 1 with the proviso that at least one of x or y is 1 and preferably each of x and y are 1. Preferably, the R group(s) is independently an alkyl group having from 4 to 20, more preferably from 6 to 12 carbon atoms. The alkyl groups can be linear, branched or cyclic, but linear or branched radicals are preferred. The M+ ammonium ion radicals are of the formula $(R')_3HN^+$ wherein each R' is independently hydrogen, a $C_1$-$C_4$ alkyl or a $C_1$-$C_4$ hydroxyalkyl radical. Illustrative $C_1$-$C_4$ alkyl and hydroxyalkyl radicals include methyl, ethyl, propyl, isopropyl, butyl, hydroxymethyl and hydroxyethyl. Typical ammonium ion radicals include ammonium ($N^+H_4$), methylammonium ($CH_3N^+H_3$), ethylammonium ($C_2H_5N^+H_3$), dimethylammonium (($CH_3$)$_2N^+H_2$), methylethylammonium ($CH_3N^+H_2C_2H_5$), trimethylammonium (($CH_3$)$_3N^+H$), dimethylbutylammonium (($CH_3$)$_2N^+HC_4H_9$), hydroxyethylammonium ($HOCH_2CH_2N^+H_3$) and methylhydroxyethylammonium ($CH_3N^+H_2CH_2CH_2OH$). Preferably, each M is independently ammonium or substituted ammonium or alkali metal.

The alkylated diphenyl sulfonates and their methods of preparation are well-known in the art and reference is made thereto for the purposes of this invention. Representative surfactants and their methods of preparation are disclosed in U.S. Pat. Nos. 3,264,242; 3,634,272; and 3,945,437 (all of which are hereby incorporated by reference).

In the practice of the present invention, the alkylated diphenyl sulfonate is typically a mixture of compounds having the formula (I) wherein sufficient x and y are 1 such that the sum of x plus y for the alkylated diphenyl sulfonate is at least about 1.5, more preferably at least about 1.75 and most preferably about 2. That is, it is preferred that a mixture of alkylated diphenyl sulfonates are used in the practice of this invention and that at least about 50 percent, more preferably at least about 75 percent and most preferably at least about 90 percent of the alkylated diphenyl sulfonates are disulfonates. In addition, mixtures of a mono- or dialkylated diphenyl sulfonate or a mixture of mono- and dialkylated diphenyl sulfonates can be employed.

Most preferably, an alkylated diphenyl oxide disulfonate or mixture of two or more alkylated diphenyl oxide disulfonates are employed in the practice of the present invention. Non-limiting examples of preferred alkylated diphenyl oxide disulfonates include sodium disulfonated hexyldiphenyl oxide, sodium disulfonated decyldiphenyl oxide and sodium disulfonated dodecyldiphenyl oxide.

The second part of the surfactant mixture useful in the mobility control fluid is a amphoteric surfactant capable of forming foams when dissolved in aqueous media. Amphoteric surfactants include betaines. Such surfactants contain a quaternary ammonium group and an anionic group within the same molecule wherein the anionic group may be sulfate, sulfonate, carboxylate or phosphate. In a preferred embodiment, the amphoteric surfactant corresponds to the formula:

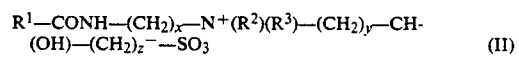

wherein $R^1$ is a linear, branched or cyclic, saturated or unsaturated hydrocarbon moiety containing from about 6 to 18 carbon atoms; $R^2$ and $R^3$ are independently in each occurrence a linear, branched or cyclic, saturated or unsaturated hydrocarbon moiety containing from about 1 to about 5 carbon atoms; and x, y and z are independently in each occurrence from 1 to about 10. In a preferred embodiment, $R^1$ contains from about 12 to about 15 carbon atoms and is more preferably derived from coconut oil. It is also preferred that $R^2$ and $R^3$ are alkyl and more preferred that they are each methyl. It is preferred that x, y and z are from 1 to about 5 and more preferred that x is 3 and y and z are each 1.

In a second preferred embodiment, the amphoteric surfactant corresponds to the formula:

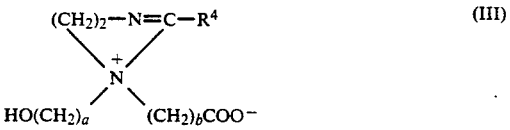

wherein $R^4$ is a linear, branched or cyclic, saturated or unsaturated hydrocarbon moiety containing from about 6 to 18 carbon atoms, preferably about 12 to 15 carbon atoms and is more preferably derived from coconut oil. The value of a may range from 2 to 4 and the value of b may range from 1 to about 5. It is more preferred that a is 2 and b is 1.

The amphoteric surfactants useful in the practice are available commercially or may be prepared by processes known in the art as described in U.S. Pat. Nos. 4,704,229, 4,501,673 and 4,259,191.

In preparing the surfactant component of the mobility control fluid, the alkylated diphenyl sulfonate and amphoteric surfactants are each diluted in water or other solvent or mixture of solvents such that they are in the liquid phase at 10° C. to 50° C. at atmospheric pressure. If necessary, additional water or other solvent is added in small amounts to prevent gel formation or dissolve any gels formed during manufacture. It should be noted that other anionic and/or non-ionic surfactants as well as other additives known in the art may be added to the mobility control fluid.

The relative amounts of alkylated diphenyl sulfonate and amphoteric surfactants are preferably such that they are present in a weight ratio such that there are from about 95 grams of anionic surfactant for each 5 grams of amphoteric surfactant to about 5 grams of anionic surfactant for each 95 grams of amphoteric surfactant. Preferably, the compositions fall within the range such that there are from about 95 grams of anionic surfactant for each 5 grams of amphoteric surfactant to about equal weights of anionic and amphoteric surfactants. More preferably, the compositions fall within the range such that there are from about 95 grams of anionic surfactant for each 5 grams of amphoteric surfactant to about 60 grams of anionic surfactant for each 40 grams of amphoteric surfactant.

The surfactant blend preferably contains one or more water soluble co-solvents which act to prevent gel formation, thus improving the ease of use of the product. More preferably, the water soluble co-solvent will also act to increase the quantity of foam generated by the surfactant mixture and simultaneously decrease the rate of drainage of liquid from the foam. Examples of such solvents are methanol, ethanol and other short chain alcohols. Other water soluble solvents may be used. Ethanol is preferred.

In the practice of the invention, the water soluble co-solvent may be added to one or both of the surfactants prior to blending or to the surfactant mixture prior to dissolving same in the injectant water or to an aqueous solution of the surfactant mixture. Preferably, the water soluble co-solvent is added to one or both of the surfactants prior to blending.

The surfactant mixture may contain from zero up to about 30 weight percent of the co-solvent. The range of co-solvent concentrations giving improved stability to the foam will depend on the concentration of the surfactants in the surfactant mixture and on the particular co-solvent used.

It will be recognized by one skilled in the art that in the use of the surfactant blend with the co-solvent a variety of factors including engineering concerns and economics will determine the optimum blend.

The amounts of surfactants most advantageously employed in preparing the mobility control fluid are dependent on a variety of factors including the specific surfactants and aqueous liquid employed and the specific end-use application. In general, the mobility control fluid will advantageously comprise from about 0.01 to about 10, preferably 0.1 to about 5.0 weight percent of the surfactant mixture. In addition to the surfactant mixture, the mobility control fluid may comprise from about zero to about 25 weight percent of a salt such as sodium chloride or potassium chloride and additional additives such as calcium chloride or magnesium chloride with the remainder being water. The pH of the resulting mobility control fluid may be any which will function in the process of this invention. The pH of the mobility control preferably ranges between about 3 and about 10, more preferably between about 5 and about 10.

The drive or displacement fluid employed in the gas flooding operation of the present invention is a gas or a combination of gas and aqueous fluids. The fluid in either case may be in a supercritical state. The miscible fluid employed in the miscible flooding operation of the present invention is a supercritical fluid which is soluble in the crude oil present in the reservoir. In the miscible fluid operation of this invention, the flow of miscible fluid through the porous material forming the subterranean reservoir is reduced due to the improved conformance control caused by the foam. This results in increasing the contact time between the miscible fluid and the oil which causes a more effective mobilization of the oil. A second benefit of the mobility control effected by the foam is the reduction of injected gas produced at one or more producing wells. This benefit applies to both gas flood and miscible flood operations. This can result in significant economic benefits due to a reduction in the costs associated with handling large quantities of produced gas and recompression costs if the produced gas is to be reinjected.

The drive fluid is suitably any gas or supercritical fluid which, at the temperature and pressure within the subterranean formation, and in the presence of the aqueous fluid containing the foam forming surfactant, forms at least two phases, one of which is the aqueous phase containing the foam forming surfactant. Air, nitrogen, carbon dioxide, normally gaseous paraffinic hydrocarbons such as methane, ethane, propane or butane as well as normally gaseous olefinic hydrocarbons such as ethylene propylene or butylene and mixtures thereof are preferably employed. Crude gases such as exhaust gas or flue gas which are predominantly carbon dioxide and nitrogen, as well as natural gas or liquefied petroleum gas may also be used. The most preferred drive fluid will depend on local reservoir conditions such as fracture pressure and temperature and on the availability of economically priced materials.

Although the gas flooding operation or miscible gas flooding operation can be initiated at essentially any time during the recovery operation, in general, the gas flooding operation or miscible gas flooding operation is initiated following the economic recovery of the hydrocarbon from the reservoir using primary and secondary (e.g., water flooding) recovery techniques on the formation.

In the practice of the present invention, the miscible drive fluid comprising the miscible gas or the miscible gas and fluid mixture or the drive fluid comprising the non-miscible gas or the non-miscible gas and liquid mixture, and the mobility control fluid may be injected sequentially or simultaneously into the subterranean formation using techniques known in the art. The miscible fluid comprising the miscible gas is injected for a period of time into the formation through one or more injection wells to mobilize the oil contained in the formation. In the gas flooding method, the drive fluid comprising the non-miscible gas or the non-miscible gas and aqueous fluid mixture is injected, for a period of time, into the formation through one or more injection wells to drive the non-trapped or mobile hydrocarbon contained by the formation to the producing well. The most advantageous pattern on injector and producing wells will depend on reservoir geology and production history.

In general, the pressure at which the gas flooding or miscible flooding operation is conducted will be determined by the existing reservoir pressure engineering requirements, consistent with safe engineering practice. There are no reasonable pressure limitations to the practice of the invention. The temperature of the reservoir or the injected drive fluid or the surfactant solution preferably does not exceed about 110° C. The pH of the reservoir connate water is preferably at least about 3.0 and no greater than about 10.0, more preferably at least about 4.0 and no greater than about 9.0, most preferably at least about 5.0 and no greater than about 8.0.

The drive fluid or miscible fluid is employed in conventional amounts normally dictated by the gas or miscible gas flooding operation. In general, injection of the drive fluid or miscible fluid is continued until the recovery of the hydrocarbon becomes unacceptable or until undesirable amounts of the drive fluid or miscible fluid break through into the producing wellbore (i.e., the gas-to-oil ratio (G.O.R.) increases to an unacceptable level). These factors depend, to a large extent, on the specific subterranean formation being treated and the desired levels of hydrocarbon production. At such time, the injection of the drive fluid or miscible fluid into the formation is interrupted and the mobility control fluid is injected into the formation through the same or different injection well. Injection of the mobility control fluid is continued for the desired amount of time.

Optionally, after the injection of the surfactant solution or mobility control fluid, water is injected into the formation through the injection wells to drive the surfactant solution into the formation to promote its effectiveness as a mobility control agent. Subsequent to the injection of the mobility control fluid and water, if employed, injection of the same or different drive fluid or miscible fluid is again initiated for a period of time, after which, if further treatment is desired, the injection of the mobility control fluid is again initiated.

The specific conditions at which the mobility control fluid are most advantageously employed depend on a variety of factors. These factors include the specific drive fluid or miscible fluid and mobility control fluid being used, the specific surfactants being employed in the mobility control fluid, and the specific formation being treated. The amount of mobility control agent added will depend on the engineering requirements of the field and the type of enhanced oil recovery process being practiced.

The method of the present invention can be employed in formations containing connate water varying from fresh water to concentrated brine. The method is particularly useful when high concentrations of multivalent ions are present. The mobility control fluid of the present invention is particularly useful in the recovery of hydrocarbons from reservoirs of moderate temperature (below about 110° C.) and pH (between about pH 4 and pH 9). The alkylated diphenyl sulfonate and foam forming amphoteric surfactants act as an excellent mobility control agent, thereby improving the sweep efficiency of the gas drive or miscible fluid and the overall hydrocarbon production, without the need for supplemental surfactants.

The following examples are provided to further describe the invention, but should not be considered as limiting it in any way. Unless stated otherwise, all parts and percentages are by weight.

EXAMPLE 1

Evaluation of Foam Stability

A blend containing cocamido-2-hydroxypropyl sultaine (CAS) and a disulfonated salt of a disulfonated decyldiphenyl oxide (DDO) is prepared by mixing each surfactant to obtain the weight percent DDO, based on the total weight of CAS and DDO, as specified in Table I below. In those cases in which the blends tend to form gels, thorough mixing is used. A solution of each blend is prepared in 5 weight percent NaCl such that there was 0.5 weight percent active material in each solution.

In each test, 100 g of the surfactant solution prepared as described above at about 25° C. is poured into a 1 quart blender without the formation of foam. The solution is sheared at about 1700 revolutions per minute (RPM) for about 25 seconds and the foam is transferred to a one liter volumetric cylinder within 60 seconds following the beginning of the shearing action. The foam volume is measured after the elapse of 60 seconds from the time shearing started. The time required for 50 milliliters of liquid to accumulate is measured timed from the end of the shearing action. The results obtained are presented in Table I below.

TABLE I

| | Weight % DDO in Surfactant | Time for 50 ml to Drain (s) | Foam Vol. at 1 min. (ml) | Foam Vol. at 5 min (ml) |
| --- | --- | --- | --- | --- |
| 1[1] | 0.00 | 134 | 314 | 234 |
| 2 | 20.38 | 124 | 305 | 227 |
| 3 | 40.58 | 99 | 292 | 213 |
| 4 | 50.59 | 107 | 295 | 215 |
| 5 | 60.57 | 133 | 325 | 255 |
| 6 | 80.37 | 139 | 325 | 246 |
| 7[1] | 100.00 | 65 | 280 | 200 |

[1]Not an embodiment of the invention

The data in Table I above demonstrates that the DDO surfactant alone results in a foam having significantly less volume and stability than that obtained from an amphoteric surfactant. When the blended surfactant is used, foams are obtained with improved volume and stability over that obtained using DDO alone in each case. In Runs 5 and 6, the blended surfactant results in improved stability when compared to the amphoteric surfactant used alone.

EXAMPLE 2

Evaluation of Foam Stability

The procedure outlined in Example 1 is followed with the exception that a disodium salt of a disulfonated hexyldiphenyl oxide (DHO) is used in place of the disodium salt of a disulfonated decyldiphenyl oxide. The results obtained are shown in Table II below.

TABLE II

| | Weight % DHO in Surfactant | Time for 50 ml to Drain (s) | Foam Vol. at 1 min. (ml) | Foam Vol. at 5 min (ml) |
| --- | --- | --- | --- | --- |
| 1[1] | 0.00 | 134 | 314 | 234 |
| 2 | 18.86 | 152 | 305 | 227 |
| 3 | 39.57 | 230 | 292 | 213 |
| 4 | 50.10 | 255 | 295 | 215 |
| 5 | 60.38 | 278 | 325 | 255 |
| 6 | 76.64 | 315 | 325 | 246 |
| 7 | 90.03 | 337 | 500 | 465 |
| 8 | 94.98 | 325 | 500 | 465 |
| 9 | 100.00 | 147 | 280 | 200 |

[1]Not an embodiment of the invention

EXAMPLE 3

Evaluation of Foam Stability

The procedure outlined in Example 1 is followed with the exception that a disodium salt of a disulfonated branched dodecyldiphenyl oxide (b-DDO) is used in place of the disodium salt of a disulfonated decyldiphenyl oxide. The results obtained are shown in Table III below.

TABLE III

| | Weight % b-DDO in surfactant | Time for 50 ml to Drain (s) | Foam Vol. at 1 min. (ml) | Foam Vol. at 5 min (ml) |
|---|---|---|---|---|
| 1[1] | 0.00 | 134 | 314 | 234 |
| 2 | 23.96 | 105 | 262 | 200 |
| 3 | 45.65 | 98 | 272 | 200 |
| 4 | 55.75 | 130 | 300 | 230 |
| 5 | 65.40 | 147 | 316 | 250 |
| 6 | 83.45 | 133 | 295 | 225 |
| 7[1] | 100.00 | 71 | 250 | 150 |

[1] Not an embodiment of the invention

EXAMPLE 4

Evaluation of Foam Stability

The procedure outlined in Example 1 is followed with the exception that (1-(1-(2'-hydroxyethyl)-2-cocoalkyl-2-imidazolium)acetate) is used in place of cocamido-2-hydroxypropyl sultaine. Where necessary, water is added to reduce the viscosity of any gels which form. The results obtained are shown in Table IV below.

TABLE IV

| | Weight % DDO in Surfactant | Time for 50 ml to Drain (s) | Foam Vol. at 1 min. (ml) | Foam Vol. at 5 min (ml) |
|---|---|---|---|---|
| 1[1] | 0.00 | 107 | 210 | 125 |
| 2 | 19.93 | 106 | 270 | 192 |
| 3 | 39.75 | 106 | 265 | 195 |
| 4 | 50.77 | 110 | 278 | 210 |
| 5 | 61.64 | 99 | 265 | 197 |
| 6 | 79.86 | 73 | 220 | 150 |
| 7[1] | 100.00 | 49 | 210 | 175 |

[1] Not an embodiment of the invention

EXAMPLE 5

Evaluation of Foam Stability in Hard Brine

The procedure outlined in Example 1 is followed with the exception that 0.5 g of the surfactant blend is dissolved in 100 ml of brine solution containing 20,000 parts per million (ppm) calcium chloride; 10,000 ppm magnesium chloride; and 100,000 ppm sodium chloride. Foam height is only measured at one minute. The results obtained are shown in Table V below.

TABLE V

| | Weight % DDO in Surfactant | Time for 50 ml to Drain (s) | Foam Vol. at 1 min. (ml) |
|---|---|---|---|
| 1[1] | 0.00 | 128 | 230 |
| 2 | 20.98 | 144 | 275 |
| 3 | 43.10 | 129 | 230 |
| 4 | 53.33 | 133 | 220 |
| 5 | 62.96 | 132 | 240 |
| 6 | 80.31 | 134 | 235 |
| 7[1] | 100.00 | 68 | 180 |

[1] Not an embodiment of the invention

EXAMPLE 6

Mobility Reduction Factor

A measure of the effectiveness of a foam forming surfactant in reducing the flow of gas through a porous medium is the mobility reduction factor (MRF). MRF is the ratio of the pressure required to drive the displacement fluid consisting of gas or miscible fluid and surfactant solution at a given rate through a porous medium to the pressure required to drive the displacement fluid consisting of gas or miscible fluid and liquid without surfactant through the same porous medium at the same rate. During the test, the ratio of gas volume to liquid volume is kept constant, that is, the foam quality is kept constant. When choosing a surfactant for a given application, it is normal to simulate the reservoir conditions as closely as possible by applying overburden pressure, using a rock core from the reservoir in question, using brine similar to that to be used during the enhanced oil recovery project and thermostating the test core at reservoir temperature. The back pressure will approach that of the reservoir, but will in general be at least about 500 psig.

The core used in the following examples is a Berea sandstone cylinder measuring about 10 cm in length and having an area of about 11.2 $cm^2$ and is contained in a stainless steel holder within a lead sleeve to which a confining pressure of about 10.7 Mpa (1552 psi) is applied. The core holder is placed in a thermostatted oven maintained at about 55° C. Liquids are injected into the core by a high pressure liquid chromatography (HPLC) pump. The drive gas, nitrogen, is supplied from a cylinder and the flow rate is controlled by a mass flow controller. A back pressure regulator, downstream of the core, is used to control the system pressure at about 13.1 Mpa (1900 psi).

Cores are prepared for the examples presented in Table II in the following manner. Each core is mounted in a core holder and its absolute permeability to air is measured. A suitable core is prepared for brine saturation by evacuating and filling it with carbon dioxide. Brine, containing 0.136 g/L $NaHCO_3$, 1.379 g/L $MgSO_4$, 16.264 g/L $MgCl_2.6H_2O$, 49.887 g/L $CaCl_2.2H_2O$ and 81.407 g/L NaCl for a total of 128.20 g/L solids (exclusive of waters of hydration) and filtered through 0.45 micron filter, is injected into the core until the core is completely saturated and the absolute permeability to brine is measured. Brine (1.2 ml per hour) and nitrogen (62.7 ml per hour) are then injected simultaneously at a constant total flow rate and a fixed gas/liquid ratio to determine the baseline pressure drop for combined gas/liquid flow in the absence of surfactant. Once a stable pressure drop is attained, a surfactant solution at the percent active concentration shown in Table VI below and nitrogen are coinjected at the same flow rates and gas to liquid ratio as in the base case until a constant pressure gradient for the combined gas/liquid flow in the presence of surfactant is recorded. Full-core and half-core pressure is measured at this point to insure that the pressure drop across the core to the mid-point is approximately half of that across the whole core thus indicating that no plugging is occurring and that foam is propagated through the core. The surfactant concentration is then increased and pressures drops are again allowed to reach equilibrium values to measure the MRF's of the concentrations of surfactants listed in Table VI below.

TABLE VI

| Surfactant Concentration (Wt %) | | Surfactant | | | |
|---|---|---|---|---|---|
| | | $A^{1.5}$ | $B^{2.5}$ | $C^3$ | $E^4$ |
| 0.25 | baseline dP(psi) | — | — | 1.5 | 1.8 |
| | dP (half)(psi) | — | — | 4.0 | 8.5 |
| | dP (full)(Psi) | — | — | 8.0 | 31.0 |
| | MRF | — | — | 5.3 | 17.00 |

TABLE VI-continued

| Surfactant Concentration (Wt %) | | Surfactant | | | |
|---|---|---|---|---|---|
| | | A[1,5] | B[2,5] | C[3] | E[4] |
| 0.5 | baseline dP(psi) | 1.7 | 2.2 | 1.5 | 1.8 |
| | dP (half)(psi) | 1.1 | 4.1 | 5.2 | 9.2 |
| | dP (full)(Psi) | 3.6 | 8.6 | 12.0 | 32.0 |
| | MRF | 2.1 | 3.9 | 8.3 | 18.00 |
| 1.0 | baseline dP(psi) | 1.7 | 2.2 | 1.5 | 1.8 |
| | dP (half)(psi) | 1.1 | 6.0 | 13.0 | 11.0 |
| | dP (full)(Psi) | 3.6 | 21.0 | 23.0 | 42.0 |
| | MRF | 2.1 | 9.5 | 15.0 | 23.0 |
| 1.5 | baseline dP(psi) | — | 2.2 | 1.5 | 1.8 |
| | dP (half)(psi) | — | 9.0 | 18.0 | 12.0 |
| | dP (full)(Psi) | — | 22.0 | 32.0 | 49.0 |
| | MRF | — | 10.0 | 21.0 | 27.0 |

[1] Disodium salt of n-decyldiphenyloxide disulfonate.
[2] Cocoamido-2-hydroxypropyl sultaine.
[3] 60 weight % A and 40 weight % B, blend also contains ethanol.
[4] 40 weight % A and 60 weight % B.
[5] Not an embodiment of this invention.

EXAMPLE 7

Adsorption Tests

The reduced adsorption of amphoteric surfactant onto Berea sandstone through the use of this invention was demonstrated by injecting solutions of surfactants individually through Berea core in the absence of coinjected gas. The adsorption tests were performed in cylindrical Berea sandstone cores (10cm×11.2 cm$^2$) prepared as described in Example 6. A separate core was used for each surfactant. The properties of the Berea cores are listed in Table VII together with the surfactants tested in each case.

The adsorption tests were done using 1.0% active solutions of each surfactant in the synthetic brine of Example 6. Surfactant retention was demonstrated through the use of tritiated water in the surfactant slug. The conditions for each experiment are listed in Table VIII. Samples of eluant were taken periodically during each experiment and analyzed for surfactant concentration. In the case of blended surfactants, the anionic and amphoteric components were determined individually. By this means, the minimal degree of surfactant separation occurring during the practice of the invention was demonstrated. The diphenyl oxide based component was determined by ultraviolet spectroscopy and the amphoteric component was determined by difference on determining the total organic carbon (TOC) content of the eluant aliquot. The total content of the surfactants in the eluant from the cores is shown in Table IX. These data demonstrate the substantial benefits of employing the invention over using the amphoteric surfactant alone in that less of the amphoteric surfactant is adsorbed when used with the anionic surfactant.

TABLE VII

Characteristics of Berea Cores Used in Adsorption Experiments

| Core # | 1 | 2 | 3 | 4 |
|---|---|---|---|---|
| Surfactant | A | B | C | D |
| Length (cm) | 9.68 | 9.87 | 9.64 | 9.65 |
| Area (ccm2) | 11.18 | 11.16 | 11.18 | 11.18 |
| Pore Vol (mL) | 23.5 | 21.4 | 22.2 | 22.9 |
| Porosity | 0.217 | 0.194 | 0.206 | 0.212 |
| 0.217 | | | | |
| Weight (g) | 226.9 | 231.4 | 226.6 | 225.6 |
| k/air (md) | 509 | 251 | 427 | 459 |
| k/brine (md) | 220 | 202 | 250 | 234 |

A = n-decyldiphenyloxide disulphonate, disodium salt
B = Cocamido-2-hydroxypropyl sultaine
C = 60% (A) + 40% (B) by active material
D = 40% (A) + 60% (B) by active material

TABLE VIII

Experimental Details of Adsorption Tests in Berea Core

| Core # | 1 | 2 | 3 | 4 |
|---|---|---|---|---|
| Surfactant | A | B | C | D |
| Flow rate (mL/hr) | 1.96 | 1.97 | 1.93 | 1.92 |
| Slug Vol (mL) | 47.1 | 45.0 | 45.0 | 48.6 |
| Slug (Pore Vol) | 2.00 | 2.10 | 2.03 | 2.12 |
| Injected TOC (ppm) | 4716 | 5073 | 4612 | 4570 |

A = n-decyldiphenyloxide disulphonate, disodium salt
B = Cocamido-2-hydroxypropyl sultaine
C = 60% (A) + 40% (B) by active material
D = 40% (A) + 60% (B) by active material

TABLE IX

Surfactant Recovered From Core Flood Experiments

| Core # | 1 | 2 | 3 | 4 |
|---|---|---|---|---|
| Surfactant | A | B | C | D |
| Surfactant Component | Surfactant recovered (Percent of that injected) | | | |
| Anionic | 97.03 | — | 89.09 | 75.06 |
| Amphoteric | — | 49.89 | 96.22 | 73.26 |
| Total | 97.03 | 49.89 | 91.69 | 74.03 |

A = n-decyldiphenyloxide disulphonate, disodium salt
B = Cocamido-2-hydroxypropyl sultaine
C = 60% (A) + 40% (B) by active material
D = 40% (A) + 60% (B) by active material

What is claimed is:

1. A method for recovering hydrocarbons from a subterranean formation which comprises injecting, sequentially or simultaneously, into the subterranean formation containing hydrocarbons,
   (1) a drive fluid selected from the group consisting of
      (a) a gas to drive the hydrocarbons,
      (b) a gas/aqueous fluid mixture to drive the hydrocarbons,
      (c) a miscible fluid to thin or solubilize and carry the hydrocarbons, and
      (d) a miscible fluid/aqueous fluid mixture to thin or solubilize and carry the hydrocarbons,
   from the formation to a producing well; and
   (2) a mobility control fluid of a surfactant/aqueous fluid mixture comprising a mixture of one or more alkylated diphenyl sulfonate surfactants and one or more foam forming amphoteric surfactants
under conditions such that the hydrocarbon is recovered from the subterranean formation.

2. The method of claim 1 wherein the alkylated diphenyl sulfonate surfactant corresponds to the formula $$\underset{(SO_3^-M^+)_y}{(R)_m\text{-}C_6H_3}\text{-}(O)_z\text{-}\underset{(SO_3^-M^+)_x}{(R)_n\text{-}C_6H_3}$$

wherein z is 0 or 1; each R is independently in each occurrence an alkyl or substituted alkyl radical; each m and n is independently 0, 1 or 2, with the proviso that in at least 70 percent of the surfactant m+n=1 and for the remaining up to 30 percent of the surfactant, m+n=2; each M is independently hydrogen, an alkali metal, alkaline earth metal, or ammonium or substituted ammonium and each x and y are individually 0 or 1 with the proviso that at least one of x or y is 1.

3. The method of claim 2 wherein x, y and z are each 1.

4. The method of claim 2 wherein R is a $C_{4-20}$ branched or linear alkyl.

5. The method of claim 4 wherein R is a $C_{6-12}$ alkyl.

6. The method of claim 1 wherein the amphoteric surfactant is selected from the group consisting of surfactants corresponding to the formula $R^1-CONH-(CH_2)_x-N^+(R^2)(R^3)-(CH_2)_y-CH-(OH)-(CH_2)_z-SO_3$ wherein $R^1$ is a linear, branched or cyclic, saturated or unsaturated hydrocarbon moiety containing from about 6 to 18 carbon atoms; $R^2$ and $R^3$ are independently in each occurrence a linear, branched or cyclic, saturated or unsaturated hydrocarbon moiety containing from about 1 to about 5 carbon atoms; and x, y and z are independently in each occurrence from 1 to about 10; and surfactants corresponding to the formula

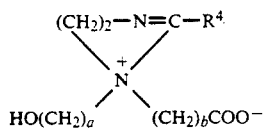

wherein $R^4$ is a linear, branched or cyclic, saturated or unsaturated hydrocarbon moiety containing from about 6 to 18 carbon atoms; a is from about 2 to about 4; and b is from about 1 to about 10.

7. The method of claim 6 wherein the amphoteric surfactant corresponds to the formula $R^1-CONH-(CH_2)_x-N^+N(R^2)(R^3)-(CH_2)_y-CH(OH)-(CH_2)_z-SO_3$ wherein $R^1$ is a linear, branched or cyclic, saturated or unsaturated hydrocarbon moiety containing from about 6 to 18 carbon atoms; $R^2$ and $R^3$ are independently in each occurrence a linear, branched or cyclic, saturated or unsaturated hydrocarbon moiety containing from about 1 to about 5 carbon atoms; and x, y and z are independently in each occurrence from 1 to about 8.

8. The method of claim 7 wherein $R^1$ is a $C_{12-15}$ hydrocarbon moiety.

9. The method of claim 7 wherein $R^2$ and $R^3$ are alkyl.

10. The method of claim 7 wherein x, y and z are from about 1 to about 5.

11. The method of claim 7 wherein the amphoteric surfactant is cocamido-2-hydroxypropyl sultaine.

12. The method of claim 6 wherein the amphoteric surfactant corresponds to the formula

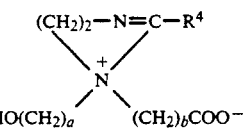

wherein $R^4$ is a linear, branched or cyclic, saturated or unsaturated hydrocarbon moiety containing from about 6 to 18 carbon atoms; a is from about 2 to about 4; and b is from about 1 to about 10.

13. The method of claim 12 wherein $R^4$ is a $C_{12-15}$ hydrocarbon moiety; a is 2; and b is from about 1 to about 5.

14. The method of claim 12 wherein a is 2 and b is 1.

15. The method of claim 12 wherein the amphoteric surfactant is 1-(1-(2'-hydroxyethyl)-2-cocoalkyl-2-imidazolinium)acetate.

16. The method of claim 1 wherein the mobility reduction factor is increased over that obtained by the use of a mobility control fluid containing the amphoteric surfactants in the absence of the alkylated diphenyl sulfonates.

17. The method of claim 1 wherein the adsorption of the amphoteric surfactants to rook, sand and clay particles of the subterranean formation is reduced compared to that experienced when a mobility control fluid containing the amphoteric surfactants in the absence of the alkylated diphenyl sulfonates is used.

18. The method of claim 1 wherein there are from about 95 grams of alkylated diphenyl sulfonate surfactant for each 5 grams of amphoteric surfactant to about 5 grams of anionic surfactant for each 95 grams of amphoteric surfactant.

19. The method, of claim 18 wherein there are about 60 grams of alkylated diphenyl sulfonate surfactant to about 40 grams of amphoteric surfactant.

* * * * *